United States Patent
Chen et al.

(10) Patent No.: US 10,324,251 B2
(45) Date of Patent: Jun. 18, 2019

(54) DISPLAY MODULES AND METHOD FOR FABRICATING THE SAME

(71) Applicant: InnoLux Corporation, Miao-Li County (TW)

(72) Inventors: Li-Ling Chen, Miao-Li County (TW); Chien-Chih Chen, Miao-Li County (TW); Chia-Chun Yang, Miao-Li County (TW); Chin-Cheng Kuo, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/817,756

(22) Filed: Nov. 20, 2017

(65) Prior Publication Data
US 2018/0143372 A1    May 24, 2018

(30) Foreign Application Priority Data
Nov. 22, 2016    (CN) .......................... 2016 1 1033121

(51) Int. Cl.
| | |
|---|---|
| *F21V 8/00* | (2006.01) |
| *G02B 5/00* | (2006.01) |
| *G02B 5/20* | (2006.01) |
| *B29C 65/14* | (2006.01) |
| *B29C 65/48* | (2006.01) |
| *G02F 1/1335* | (2006.01) |
| *G02B 5/30* | (2006.01) |
| *B29L 31/34* | (2006.01) |

(52) U.S. Cl.
CPC ........ *G02B 6/0088* (2013.01); *B29C 65/1406* (2013.01); *B29C 65/4845* (2013.01); *G02B 5/003* (2013.01); *G02B 6/0056* (2013.01); *G02F 1/133602* (2013.01); *G02F 1/133615* (2013.01); *B29L 2031/3475* (2013.01); *G02B 5/20* (2013.01); *G02B 5/30* (2013.01); *G02F 2202/28* (2013.01)

(58) Field of Classification Search
None
See application file for complete search history.

(56) References Cited

U.S. PATENT DOCUMENTS

| | | | | |
|---|---|---|---|---|
| 9,373,815 | B2* | 6/2016 | Washio | ............... H01L 51/5246 |
| 2009/0103027 | A1* | 4/2009 | Hughes | ............... G02F 1/13476 |
| | | | | 349/115 |
| 2011/0236643 | A1* | 9/2011 | Tsubouchi | ........ G02F 1/133308 |
| | | | | 428/192 |
| 2017/0212298 | A1* | 7/2017 | Chen | .................... G02B 6/0088 |

* cited by examiner

*Primary Examiner* — Kristy A Haupt
(74) *Attorney, Agent, or Firm* — McClure, Qualey & Rodack, LLP

(57) ABSTRACT

A display module is provided. The display module includes a backlight module with an upper surface, a display panel opposite to the backlight module, and a glue having a first contact surface and a second contact surface located between the display panel and the backlight module, wherein the first contact surface is in contact with the display panel, the second contact surface is in contact with the upper surface of the backlight module, and there is a gap between the display panel and the backlight module. A method for fabricating a display module is also provided.

20 Claims, 7 Drawing Sheets

DISPLAY MODULES AND METHOD FOR FABRICATING THE SAME

CROSS REFERENCE TO RELATED APPLICATIONS

This application claims priority of China Patent No. 201611033121.1, filed on Nov. 22, 2016, the entirety of which is incorporated by reference herein.

TECHNICAL FIELD

The technical field relates to a display module bonded through automatic glue coating and a method for fabricating the same.

BACKGROUND

Currently, in display modules, a light-shielding tape is attached to the edge of the thin film substrate, mainly for bearing the thin film substrate and for light-shielding. However, the conventional process of attaching the light-shielding tape requires a lot of manpower and time, as the tape is not easy to attach, especially, for example, on narrow-border models. During tape attachment, the alignment accuracy of the human eye, and thus the process yield, are less than optimal.

Therefore, it is desirable to develop a display module capable of reducing the difficulty of manual alignment or simplifying alignment attachment by automated equipment in the processes.

SUMMARY

One embodiment of the disclosure provides a display module, comprising: a backlight module with an upper surface; a display panel opposite to the backlight module; and a glue. The glue has a first contact surface and a second contact surface located between the display panel and the backlight module. The first contact surface is in contact with the display panel. The second contact surface is in contact with the upper surface of the backlight module. There is a gap between the display panel and the backlight module.

One embodiment of the disclosure provides a display module, comprising: a backlight module with an upper surface; a display panel opposite to the backlight module, and a glue. The display panel comprises a thin film substrate and a polarizer disposed on the thin film substrate. The glue has a first contact surface and a second contact surface located between the display panel and the backlight module. The first contact surface is in contact with the thin film substrate of the display panel. The second contact surface is in contact with the upper surface of the backlight module. There is a gap between the polarizer of the display panel and the backlight module.

One embodiment of the disclosure provides a method for fabricating a display module, comprising: providing a display panel comprising a thin film substrate and a polarizer disposed on the thin film substrate; coating a glue having a first contact surface and a second contact surface on the display panel, wherein the first contact surface is in contact with the display panel; performing a UV curing process on the glue; providing a backlight module with an upper surface; and performing an assembly process to assemble the display panel on the backlight module through the glue, wherein the second contact surface of the glue is in contact with the upper surface of the backlight module, and there is a gap between the display panel and the backlight module.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

Figure 1:
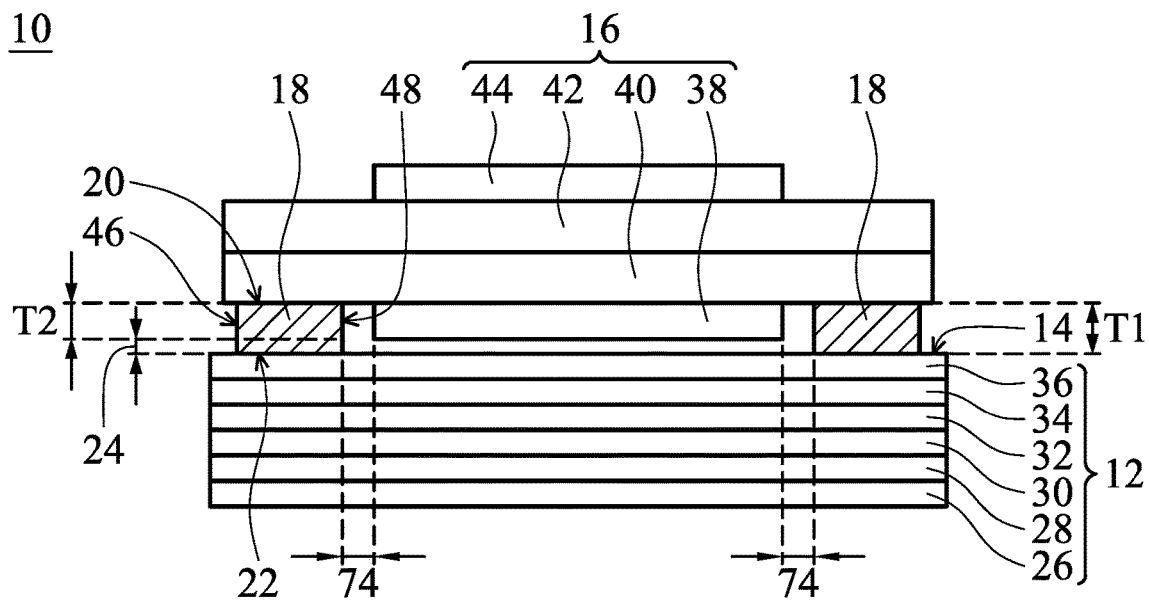
FIG. 1 is a cross-sectional view of a display module in accordance with one embodiment of the disclosure.

In the following detailed description, for the purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

Referring to FIG. 1, in accordance with one embodiment of the disclosure, a display module 10 is provided. FIG. 1 is a cross-sectional view of the display module 10 in this embodiment.

As shown in FIG. 1, the display module 10 comprises a backlight module 12 with an upper surface 14, a display panel 16 opposite to the backlight module 12, and a glue 18 having a first contact surface 20 and a second contact surface 22 located between the display panel 16 and the backlight module 12. Specifically, the first contact surface 20 is in contact with the display panel 16, the second contact surface 22 is in contact with the upper surface 14 of the backlight module 12, and there is a gap 24 between the display panel 16 and the backlight module 12.

In some embodiments, the backlight module 12 may comprise a reflection sheet 26, a light guide plate 28, a lower diffusion sheet 30, a lower prism sheet 32, an upper prism sheet 34, and an upper diffusion sheet 36 from bottom to top.

In some embodiments, the display panel 16 may comprise a lower polarizer 38, a thin film substrate 40, a color filter 42, and an upper polarizer 44 from bottom to top.

In this embodiment, the first contact surface 20 of the glue 18 is in contact with the thin film substrate 40 of the display panel 16.

In some embodiments, the first contact surface 20 is substantially parallel to the second contact surface 22 of the glue 18, and the term "substantially parallel" means that the angle therebetween is greater than or equal to +5 degrees and is less than or equal to −5 degrees.

In this embodiment, the glue 18 has a first side 46 and a second side 48, and the first side 46 and the second side 48 are planar. The first side 46 is substantially parallel to the second side 48, wherein the term "substantially parallel" means that the angle therebetween is greater than or equal to +5 degrees and is less than or equal to −5 degrees, as shown in FIG. 1.

In this embodiment, there is a gap 74 between the glue 18 and the lower polarizer 38. The width of the gap 74 is greater than or equal to 0.1 mm and is less than or equal to 0.3 mm.

In some embodiments, the glue 18 may comprise a UV-curable resin having a light-shielding effect, which is opaque (e.g., black), for example, but not limited to, an acrylic resin. In the present disclosure, various curable and opaque resins after UV illumination are suitable to be the glue 18 for assembling the display panel 16 to the backlight module 12.

In some embodiments, the glue 18 has an optical density (OD) that is greater than or equal to 1.2 and is less than or equal to 3.0 (1/light transmittance rate), wherein the light transmittance rate is the light transmission value of the detection object.

In some embodiments, the hardness of the glue 18 is greater than or equal to Shore A80 and is less than or equal to Shore A30.

In some embodiments, the thickness of the glue 18 is greater than or equal to 100 μm and is less than or equal to 500 μm.

In this embodiment, the thickness T1 of the glue 18 is greater than the thickness T2 of the lower polarizer 38.

In this embodiment, there is a gap 24 between the lower polarizer 38 of the display panel 16 and the backlight module 12.

Figure 2A:
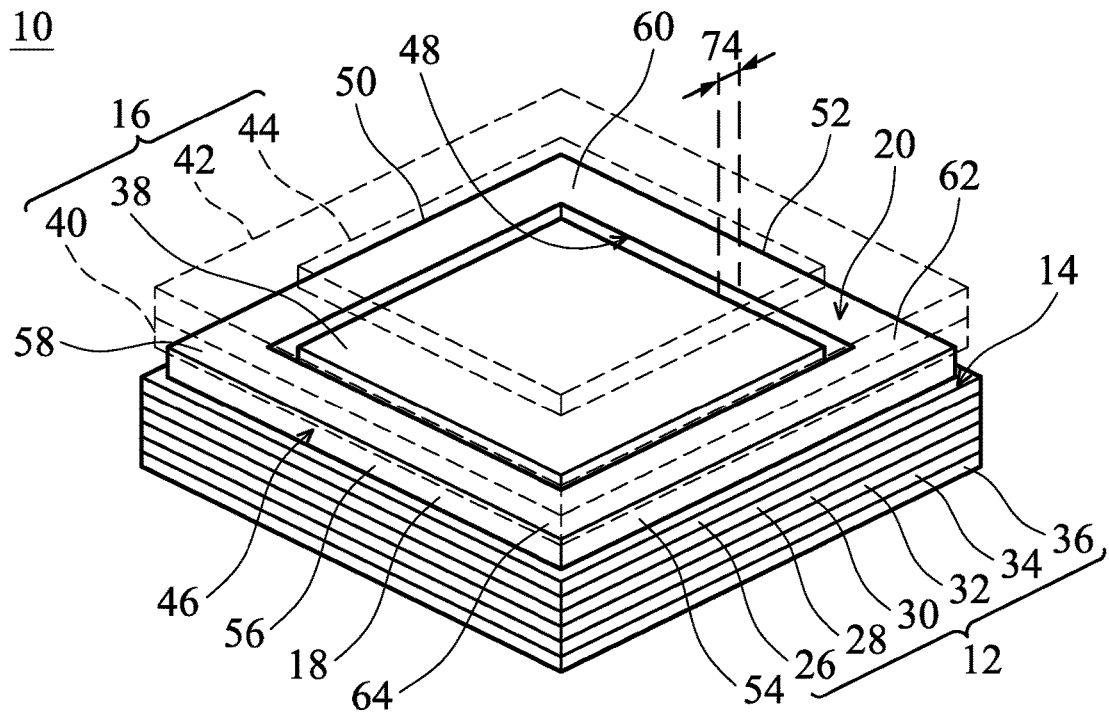
FIG. 2A is a continuous-type coating profile of the glue in accordance with one embodiment of the disclosure.
Figure 2B:
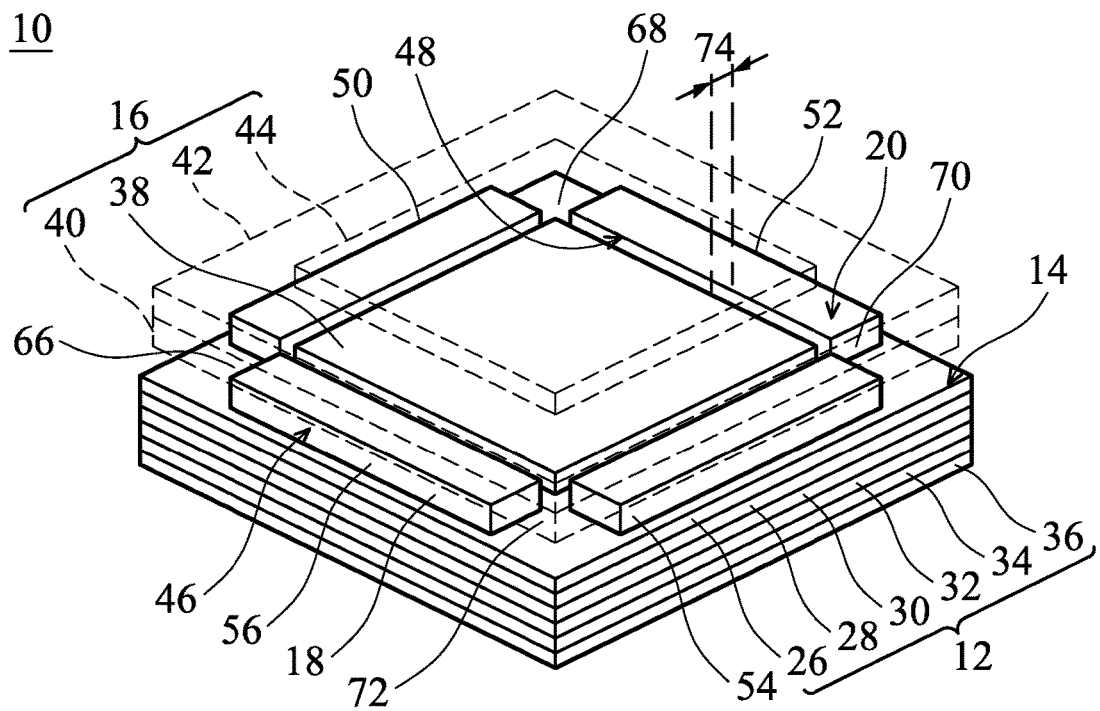
FIG. 2B is a segmented-type coating profile of the glue in accordance with one embodiment of the disclosure.

In some embodiments, the glue 18 may comprise a first portion 50, a second portion 52, a third portion 54 and a fourth portion 56 and is located between the display panel 16 and the backlight module 12, as shown in FIGS. 2A and 2B. FIG. 2A is a continuous-type coating profile of the glue 18. FIG. 2B is a segmented-type coating profile of the glue 18.

As shown in FIG. 2A, the first portion 50, the second portion 52, the third portion 54 and the fourth portion 56 of the glue 18 are connected to each other to form a plurality of junctions (58, 60, 62 and 64).

As shown in FIG. 2B, the first portion 50, the second portion 52, the third portion 54 and the fourth portion 56 of the glue 18 are separated from each other to form a plurality of gaps (66, 68, 70 and 72) therebetween.

Figure 3:
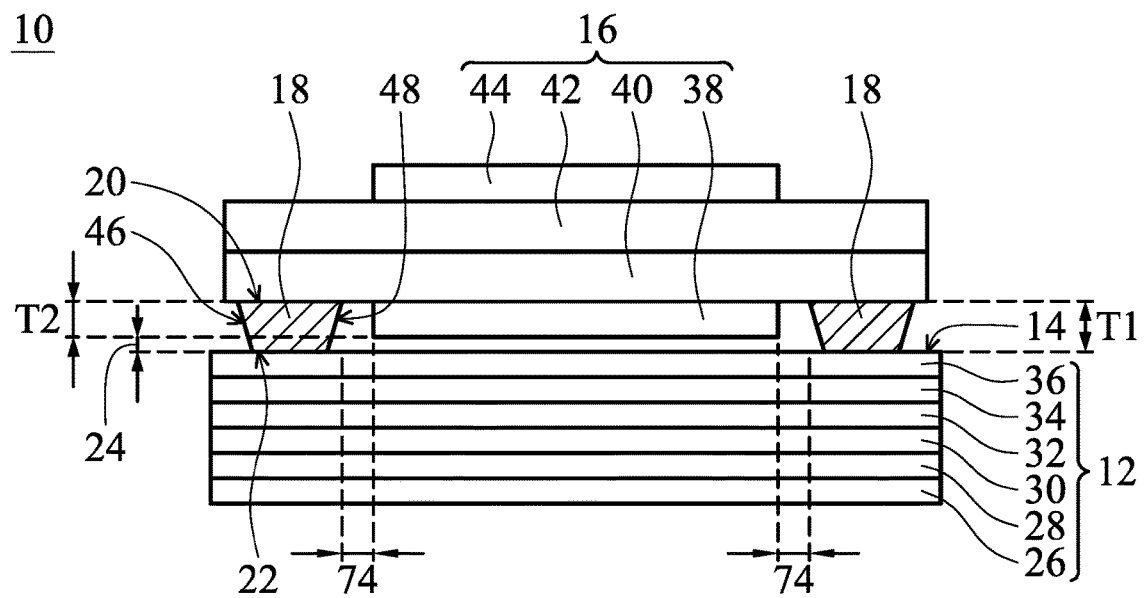
FIG. 3 is a cross-sectional view of a display module in accordance with one embodiment of the disclosure.

Referring to FIG. 3, in accordance with one embodiment of the disclosure, a display module 10 is provided. FIG. 3 is a cross-sectional view of the display module 10 in this embodiment.

As shown in FIG. 3, the display module 10 comprises a backlight module 12 with an upper surface 14, a display panel 16 opposite to the backlight module 12, and a glue 18 having a first contact surface 20 and a second contact surface 22 located between the display panel 16 and the backlight module 12. Specifically, the first contact surface 20 is in contact with the display panel 16, the second contact surface 22 is in contact with the upper surface 14 of the backlight module 12, and there is a gap 24 between the display panel 16 and the backlight module 12.

In some embodiments, the backlight module 12 may comprise a reflection sheet 26, a light guide plate 28, a lower diffusion sheet 30, a lower prism sheet 32, an upper prism sheet 34, and an upper diffusion sheet 36 from bottom to top.

In some embodiments, the display panel 16 may comprise a lower polarizer 38, a thin film substrate 40, a color filter 42, and an upper polarizer 44 from bottom to top.

In this embodiment, the first contact surface 20 of the glue 18 is in contact with the thin film substrate 40 of the display panel 16.

In some embodiments, the first contact surface 20 is substantially parallel to the second contact surface 22 of the glue 18, wherein the term "substantially parallel" means that the angle therebetween is greater than or equal to +5 degrees and is less than or equal to −5 degrees.

In this embodiment, the glue 18 has a first side 46 and a second side 48, and the first side 46 and the second side 48 are tilted, as shown in FIG. 3.

In this embodiment, there is a gap 74 between the glue 18 and the lower polarizer 38. The width of the gap 74 is greater than or equal to 0.1 mm and is less than or equal to 0.3 mm.

In some embodiments, the glue 18 may comprise a UV-curable resin having a light-shielding effect, which is opaque (e.g., black), for example, but not limited to, an acrylic resin. In the present disclosure, various curable and opaque resins after UV illumination are suitable to be the glue 18 for assembling the display panel 16 to the backlight module 12.

In some embodiments, the glue 18 has an optical density (OD) that is greater than or equal to 1.2 and is less than or equal to 3.0.

In some embodiments, the hardness of the glue 18 is greater than or equal to Shore A80 and is less than or equal to Shore A30.

In some embodiments, the thickness of the glue 18 is greater than or equal to 100 μm and is less than or equal to 500 μm.

In this embodiment, the thickness T1 of the glue 18 is greater than the thickness T2 of the lower polarizer 38.

In this embodiment, there is a gap 24 between the lower polarizer 38 of the display panel 16 and the backlight module 12.

In some embodiments, the glue 18 may comprise a first portion 50, a second portion 52, a third portion 54 and a fourth portion 56 and is located between the display panel 16 and the backlight module 12, as shown in FIGS. 2A and 2B. FIG. 2A is a continuous-type coating profile of the glue 18. FIG. 2B is a segmented-type coating profile of the glue 18.

As shown in FIG. 2A, the first portion 50, the second portion 52, the third portion 54 and the fourth portion 56 of the glue 18 are connected to each other to form a plurality of junctions (58, 60, 62 and 64).

As shown in FIG. 2B, the first portion 50, the second portion 52, the third portion 54 and the fourth portion 56 of the glue 18 are separated from each other to form a plurality of gaps (66, 68, 70 and 72) therebetween.

As shown in FIG. 3, the display module 10 comprises a backlight module 12 with an upper surface 14, a display panel 16 opposite to the backlight module 12, and a glue 18 having a first contact surface 20 and a second contact surface 22 located between the display panel 16 and the backlight module 12. Specifically, the first contact surface 20 is in contact with the display panel 16, the second contact surface 22 is in contact with the upper surface 14 of the backlight module 12, and there is a gap 24 between the display panel 16 and the backlight module 12.

In this embodiment, the glue 18 has a first side 46 and a second side 48. The first side 46 and the second side 48 are planar, but are not parallel to each other, as shown in FIG. 3.

Figure 4:
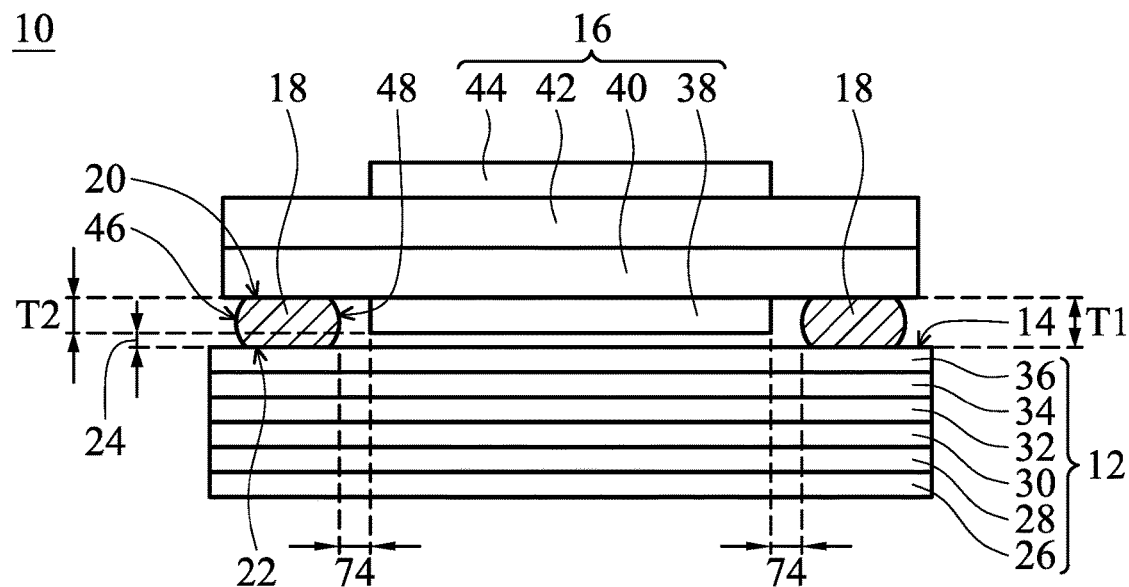
FIG. 4 is a cross-sectional view of a display module in accordance with one embodiment of the disclosure.

Referring to FIG. 4, in accordance with one embodiment of the disclosure, a display module 10 is provided. FIG. 4 is a cross-sectional view of the display module 10 in this embodiment.

As shown in FIG. 4, the display module 10 comprises a backlight module 12 with an upper surface 14, a display panel 16 opposite to the backlight module 12, and a glue 18 having a first contact surface 20 and a second contact surface 22 located between the display panel 16 and the backlight module 12. Specifically, the first contact surface 20 is in contact with the display panel 16, the second contact surface 22 is in contact with the upper surface 14 of the backlight module 12, and there is a gap 24 between the display panel 16 and the backlight module 12.

In some embodiments, the backlight module 12 may comprise a reflection sheet 26, a light guide plate 28, a lower diffusion sheet 30, a lower prism sheet 32, an upper prism sheet 34, and an upper diffusion sheet 36 from bottom to top.

In some embodiments, the display panel 16 may comprise a lower polarizer 38, a thin film substrate 40, a color filter 42, and an upper polarizer 44 from bottom to top.

In this embodiment, the first contact surface 20 of the glue 18 is in contact with the thin film substrate 40 of the display panel 16.

In some embodiments, the first contact surface 20 is substantially parallel to the second contact surface 22 of the glue 18, wherein the term "substantially parallel" means that the angle therebetween is greater than or equal to +5 degrees and is less than or equal to −5 degrees.

In this embodiment, the glue 18 has a first side 46 and a second side 48, and the first side 46 and the second side 48 are arc surfaces, as shown in FIG. 4.

In this embodiment, there is a gap 74 between the glue 18 and the lower polarizer 38. The width of the gap 74 is greater than or equal to 0.1 mm and is less than or equal to 0.3 mm.

In some embodiments, the glue 18 may comprise a UV-curable resin having a light-shielding effect, which is opaque (e.g., black), for example, but not limited to, an acrylic resin. In the present disclosure, various curable and opaque resins after UV illumination are suitable to be the glue 18 for assembling the display panel 16 to the backlight module 12.

In some embodiments, the glue 18 has an optical density (OD) that is greater than or equal to 1.2 and is less than or equal to 3.0.

In some embodiments, the hardness of the glue 18 is greater than or equal to Shore A80 and is less than or equal to Shore A30.

In some embodiments, the thickness of the glue 18 is greater than or equal to 100 μm and is less than or equal to 500 μm.

In this embodiment, the thickness T1 of the glue 18 is greater than the thickness T2 of the lower polarizer 38.

In this embodiment, there is a gap 24 between the lower polarizer 38 of the display panel 16 and the backlight module 12.

In some embodiments, the glue 18 may comprise a first portion 50, a second portion 52, a third portion 54 and a fourth portion 56 and is located between the display panel 16 and the backlight module 12, as shown in FIGS. 2A and 2B. FIG. 2A is a continuous-type coating profile of the glue 18. FIG. 2B is a segmented-type coating profile of the glue 18.

As shown in FIG. 2A, the first portion 50, the second portion 52, the third portion 54 and the fourth portion 56 of the glue 18 are connected to each other to form a plurality of junctions (58, 60, 62 and 64).

As shown in FIG. 2B, the first portion 50, the second portion 52, the third portion 54 and the fourth portion 56 of the glue 18 are separated from each other to form a plurality of gaps (66, 68, 70 and 72) therebetween.

Figure 5:
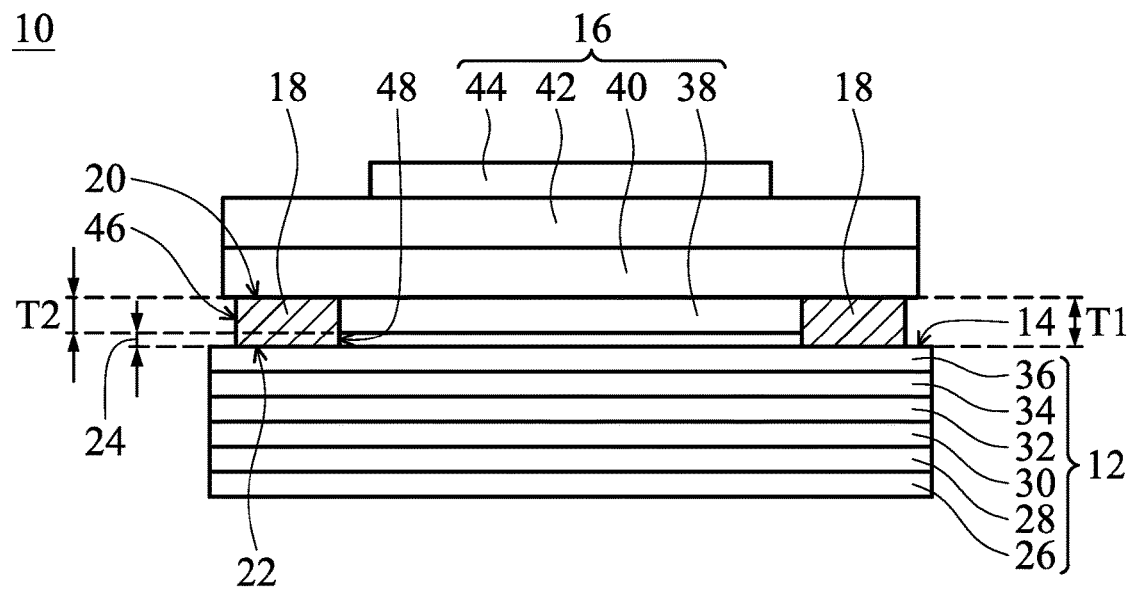
FIG. 5 is a cross-sectional view of a display module in accordance with one embodiment of the disclosure.

Referring to FIG. 5, in accordance with one embodiment of the disclosure, a display module 10 is provided. FIG. 5 is a cross-sectional view of the display module 10 in this embodiment.

As shown in FIG. 5, the display module 10 comprises a backlight module 12 with an upper surface 14, a display panel 16 opposite to the backlight module 12, and a glue 18 having a first contact surface 20 and a second contact surface 22 located between the display panel 16 and the backlight module 12. Specifically, the first contact surface 20 is in contact with the display panel 16, the second contact surface 22 is in contact with the upper surface 14 of the backlight module 12, and there is a gap 24 between the display panel 16 and the backlight module 12.

In some embodiments, the backlight module 12 may comprise a reflection sheet 26, a light guide plate 28, a lower diffusion sheet 30, a lower prism sheet 32, an upper prism sheet 34, and an upper diffusion sheet 36 from bottom to top.

In some embodiments, the display panel 16 may comprise a lower polarizer 38, a thin film substrate 40, a color filter 42, and an upper polarizer 44 from bottom to top.

In this embodiment, the first contact surface 20 of the glue 18 is in contact with the thin film substrate 40 of the display panel 16.

In some embodiments, the first contact surface 20 is substantially parallel to the second contact surface 22 of the glue 18, wherein the term "substantially parallel" means that the angle therebetween is greater than or equal to +5 degrees and is less than or equal to −5 degrees.

In this embodiment, the glue 18 has a first side 46 and a second side 48, and the first side 46 and the second side 48 are planar. The first side 46 is substantially parallel to the second side 48, wherein the term "substantially parallel" means that the angle therebetween is greater than or equal to +5 degrees and is less than or equal to −5 degrees, as shown in FIG. 5.

In this embodiment, the glue 18 is in contact with the lower polarizer 38, and there is no gap therebetween. In FIG. 5, the glue 18 is in contact with the lower polarizer 38 via the second side 48 thereof.

In some embodiments, the glue 18 may comprise a UV-curable resin having a light-shielding effect, which is opaque (e.g., black), for example, but not limited to, an acrylic resin. In the present disclosure, various curable and opaque resins after UV illumination are suitable to be the glue 18 for assembling the display panel 16 to the backlight module 12.

In some embodiments, the glue 18 has an optical density (OD) that is greater than or equal to 1.2 and is less than or equal to 3.0 (1/light transmittance rate), wherein the light transmittance rate is the light transmission value of the detection object.

In some embodiments, the hardness of the glue 18 is greater than or equal to Shore A80 and is less than or equal to Shore A30.

In some embodiments, the thickness of the glue 18 is greater than or equal to 100 μm and is less than or equal to 500 μm.

In this embodiment, the thickness T1 of the glue 18 is greater than the thickness T2 of the lower polarizer 38.

In this embodiment, there is a gap 24 between the lower polarizer 38 of the display panel 16 and the backlight module 12.

Figure 6A:
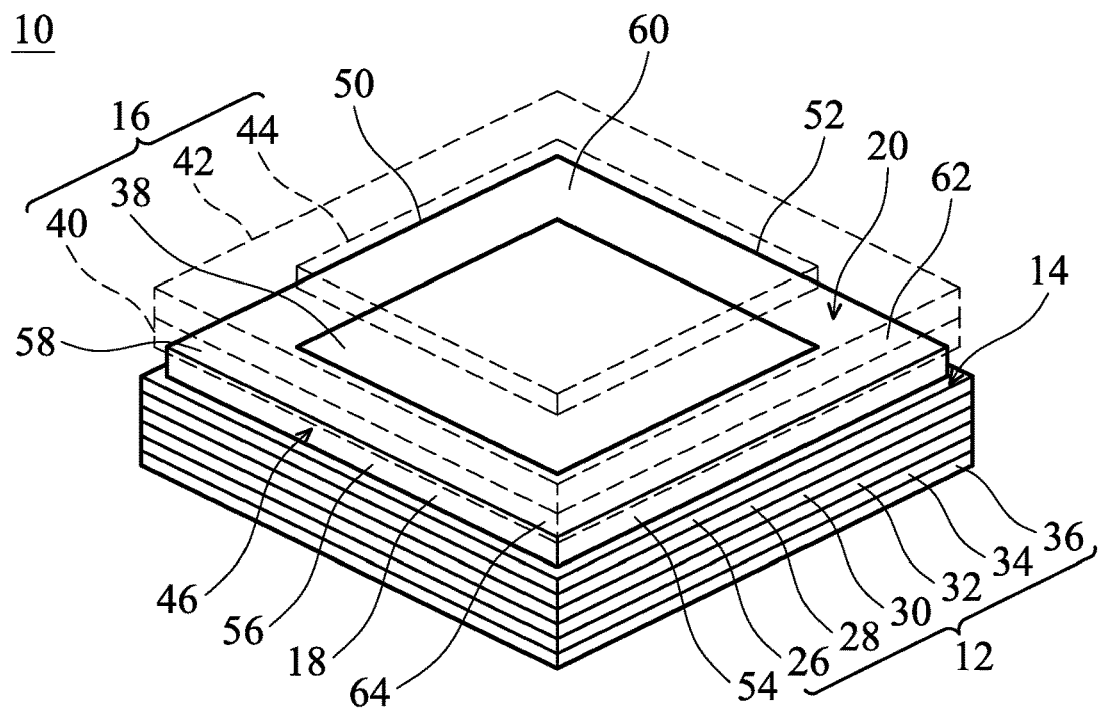
FIG. 6A is a continuous-type coating profile of the glue in accordance with one embodiment of the disclosure.
Figure 6B:
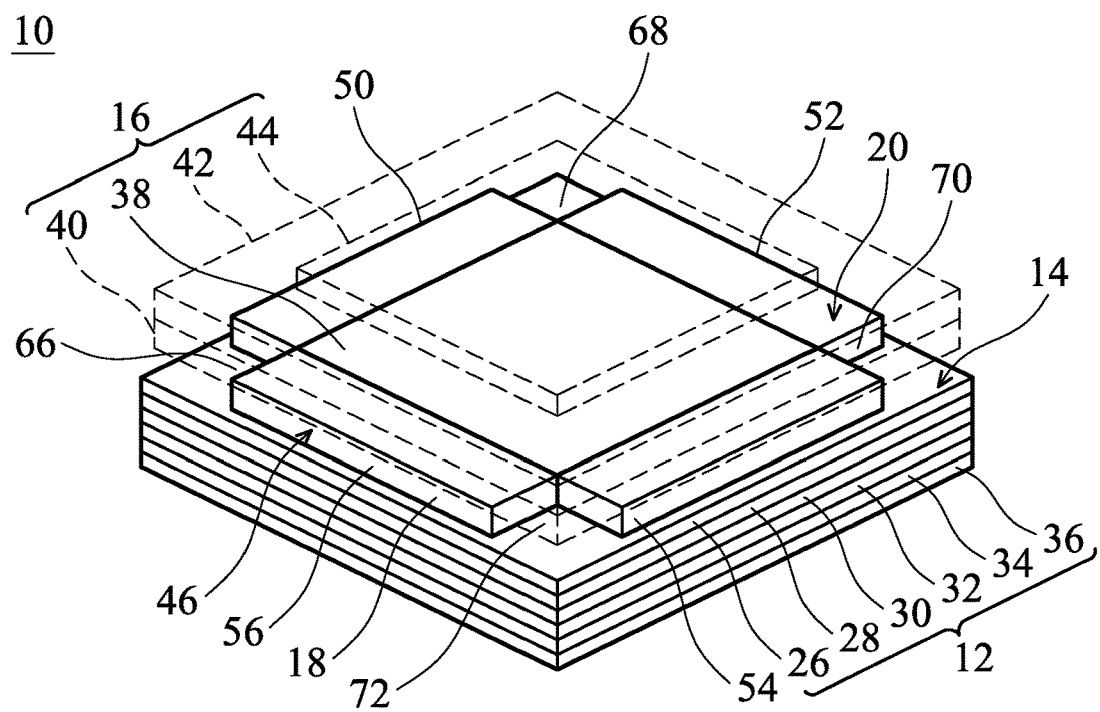
FIG. 6B is a segmented-type coating profile of the glue in accordance with one embodiment of the disclosure.

In some embodiments, the glue 18 may comprise a first portion 50, a second portion 52, a third portion 54 and a fourth portion 56 and is located between the display panel 16 and the backlight module 12, as shown in FIGS. 6A and 6B. FIG. 6A is a continuous-type coating profile of the glue 18. FIG. 6B is a segmented-type coating profile of the glue 18. Use of the continuous-type coating or the segmented-type coating may depend on the time that the glue coating process takes. The segmented-type coating has the advantage of a shorter coating time and using less glue, while the continuous-type coating has the advantage of better adhesion.

As shown in FIG. 6A, the first portion 50, the second portion 52, the third portion 54 and the fourth portion 56 of the glue 18 are connected to each other to form a plurality of junctions (58, 60, 62 and 64).

As shown in FIG. 6B, the first portion 50, the second portion 52, the third portion 54 and the fourth portion 56 of the glue 18 are separated from each other to form a plurality of gaps (66, 68, 70 and 72) therebetween.

Referring to FIGS. 7A-7D, in accordance with one embodiment of the disclosure, a method for fabricating a display module is provided. FIGS. 7A-7D are cross-sectional views of the method for fabricating a display module in this embodiment.

Figure 7A:
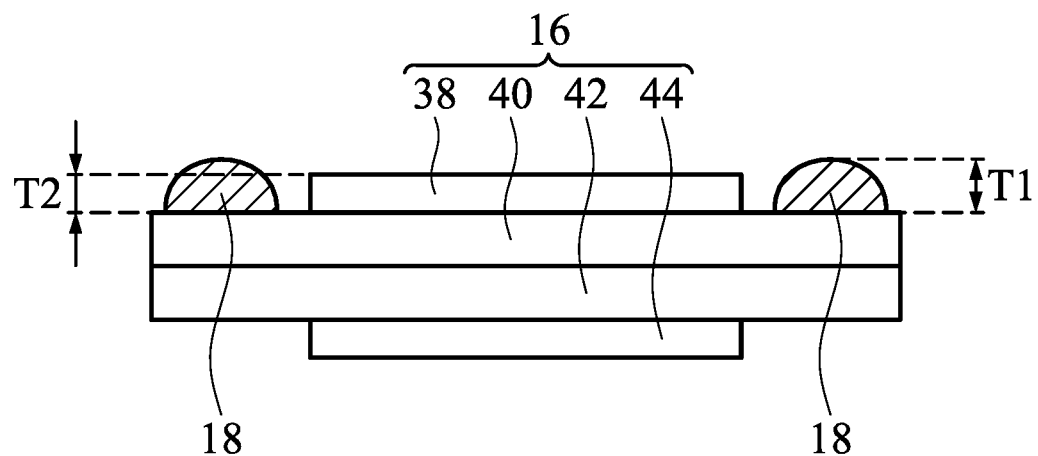
FIGS. 7A-7D are cross-sectional views of a method for fabricating a display module in accordance with one embodiment of the disclosure.

As shown in FIG. 7A, a display panel 16 is provided. The display panel 16 comprises a lower polarizer 38, a thin film substrate 40, a color filter 42, and an upper polarizer 44.

Next, a glue 18 is coated on the thin film substrate 40 of the display panel 16.

Figure 8A:
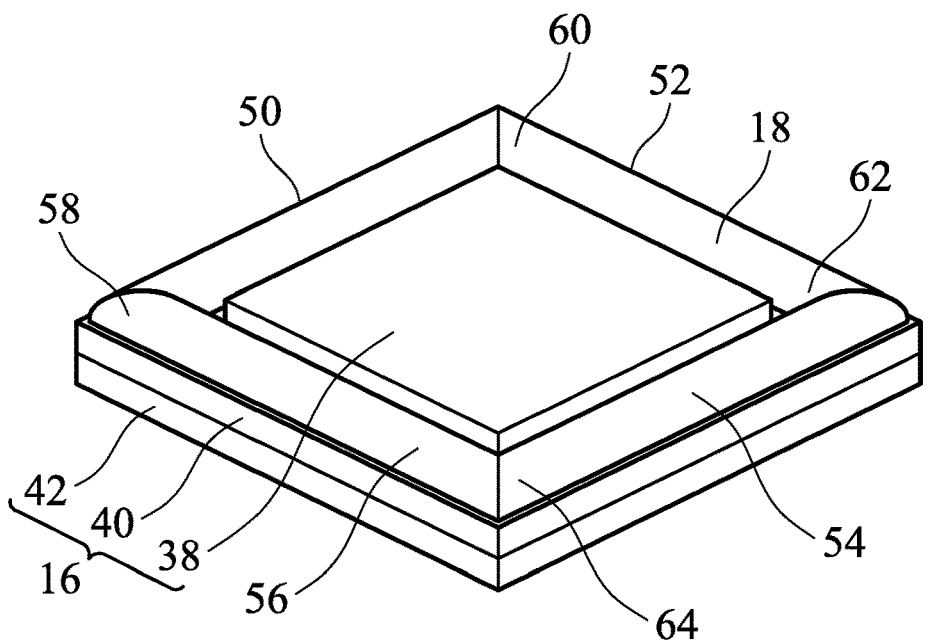
FIG. 8A is a continuous-type coating profile of the glue on a display panel in accordance with one embodiment of the disclosure.

In some embodiments, the glue 18 is coated on the thin film substrate 40 of the display panel 16 through, for example, a continuous-type coating process. The glue 18 is formed into a first portion 50, a second portion 52, a third portion 54 and a fourth portion 56. The first portion 50, the second portion 52, the third portion 54 and the fourth portion 56 are connected to each other to form a plurality of junctions (58, 60, 62 and 64), as shown in FIG. 8A. FIG. 8A is a continuous-type coating profile of the glue 18 on the thin film substrate 40 of the display panel 16.

In this embodiment, the thickness of the junctions (58, 60, 62 and 64) is greater than that of the first portion 50, the second portion 52, the third portion 54 and the fourth portion 56 of the glue 18.

Figure 8B:
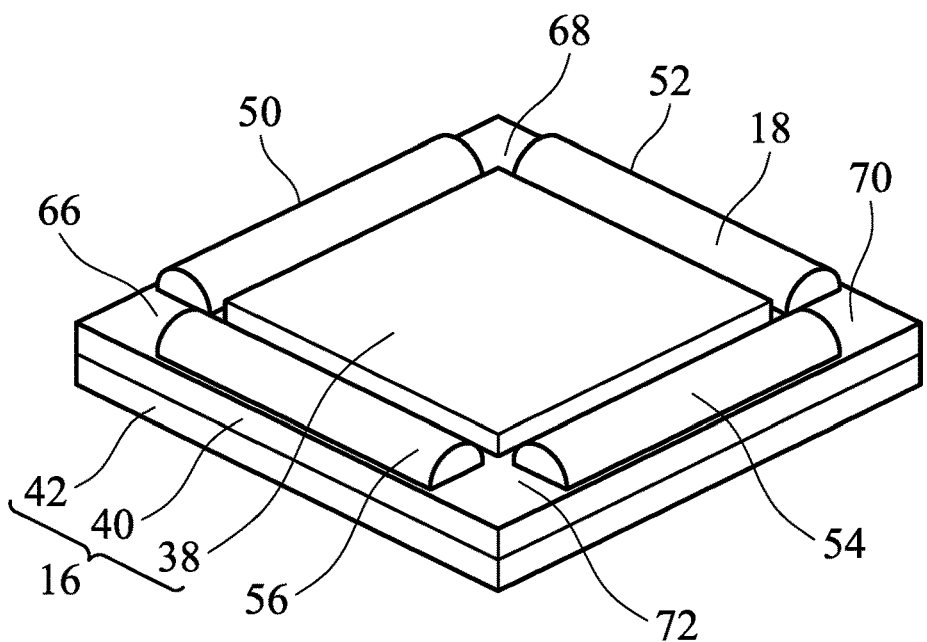
FIG. 8B is a segmented-type coating profile of the glue on a display panel in accordance with one embodiment of the disclosure.

In some embodiments, the glue 18 is coated on the thin film substrate 40 of the display panel 16 through, for example, a segmented-type coating process. The glue 18 is formed into a first portion 50, a second portion 52, a third portion 54 and a fourth portion 56. The first portion 50, the second portion 52, the third portion 54 and the fourth portion 56 are separated from each other to form a plurality of gaps (66, 68, 70 and 72) therebetween, as shown in FIG. 8B. FIG. 8B is a segmented-type coating profile of the glue 18 on the thin film substrate 40 of the display panel 16.

At this time, the glue 18 coated on the thin film substrate 40 of the display panel 16 is semi-elliptical, as shown in FIG. 7A.

As shown in FIG. 7A, the thickness T1 of the glue 18 is greater than the thickness T2 of the lower polarizer 38. In some embodiments, the thickness T1 of the glue 18 is greater than or equal to 100 μm and is less than or equal to 500 μm.

Figure 7B:
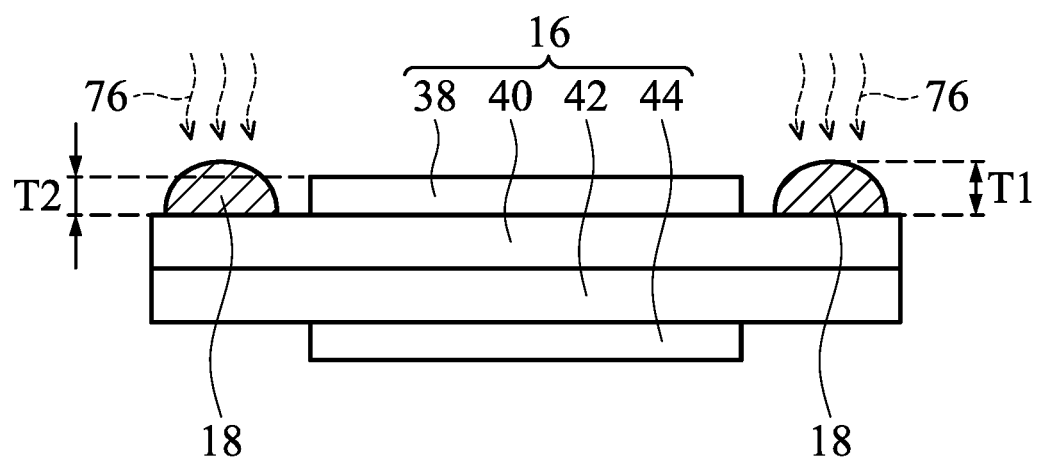

Next, referring to FIG. 7B, an ultraviolet (UV) curing process 76 is performed on the glue 18.

In some embodiments, the UV curing process 76 may provide a suitable illumination intensity which is greater than or equal to 10 W and is less than or equal to 200 mW so that the glue 18 has a suitable hardness after illumination.

In some embodiments, the UV curing process 76 may be continued for a suitable illumination time which is greater than or equal to 0.5 seconds and is less than or equal to 5 seconds to provide the glue 18 with an appropriate hardness after illumination.

The glue 18 is a UV-curable resin having a light-shielding effect, which is opaque (e.g., black), for example, but not limited to, an acrylic resin. In the present disclosure, various curable and opaque resins after UV illumination are suitable to be the glue 18 for assembling the display panel 16 to the backlight module 12.

In some embodiments, the glue 18 has an optical density (OD) that is greater than or equal to 1.2 and is less than or equal to 3.0.

In some embodiments, the hardness of the glue 18 is greater than or equal to Shore A80 and is less than or equal to Shore A30.

Figure 7C:
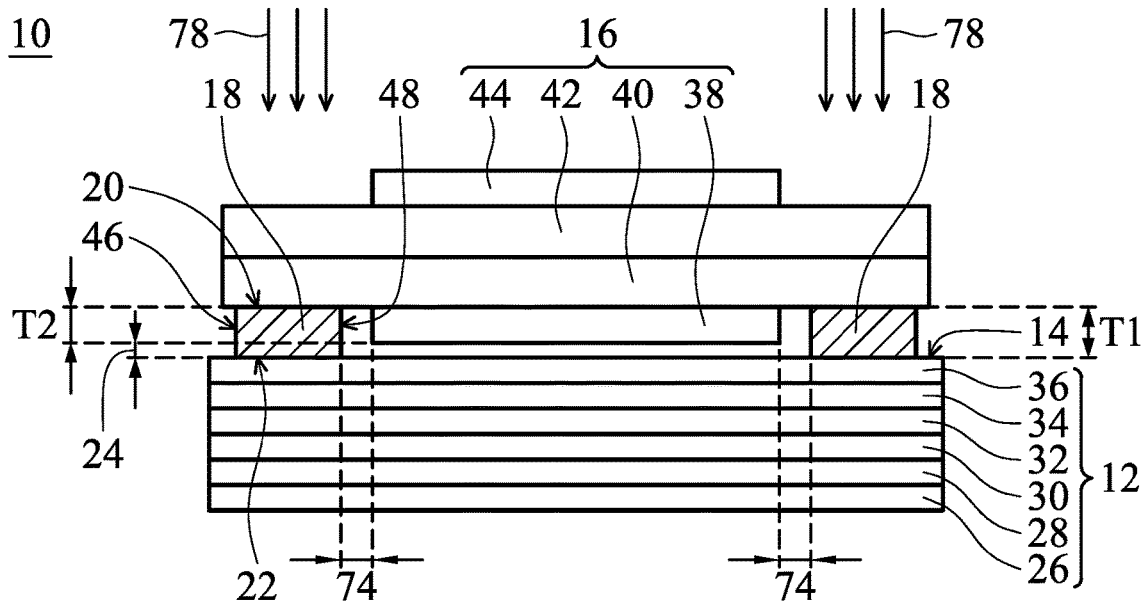

Next, referring to FIG. 7C, a backlight module 12 is provided. In this embodiment, the backlight module 12 comprises a reflection sheet 26, a light guide plate 28, a lower diffusion sheet 30, a lower prism sheet 32, an upper prism sheet 34, and an upper diffusion sheet 36 from bottom to top.

Next, an assembly process 78 is performed to assemble the display panel 16 on the backlight module 12 through the glue 18. The glue 18 has a first contact surface 20 and a second contact surface 22. In this time, the glue 18 is in contact with the thin film substrate 40 of the display panel 16 via the first contact surface 20. The glue 18 is in contact with the upper surface 14 of the backlight module 12 via the second contact surface 22. After assembly, there is a gap 24 between the lower polarizer 38 of the display panel 16 and the backlight module 12. There is a gap 74 between the glue 18 and the lower polarizer 38. The width of the gap 74 is greater than or equal to 0.1 mm and is less than or equal to 0.3 mm.

In some embodiments, the glue 18 may also be in contact with the lower polarizer 38 via the sides thereof.

After assembly, the first contact surface 20 is substantially parallel to the second contact surface 22 of the glue 18. The glue 18 has a first side 46 and a second side 48, and the first side 46 and the second side 48 are planar. The first side 46 is substantially parallel to the second side 48 of the glue 18. The term "substantially parallel" means that the angle is greater than or equal to +5 degrees and is less than or equal to −5 degrees.

In some embodiments, the first side 46 and the second side 48 of the glue 18 may also have curved surfaces or arc surfaces.

Figure 7D:
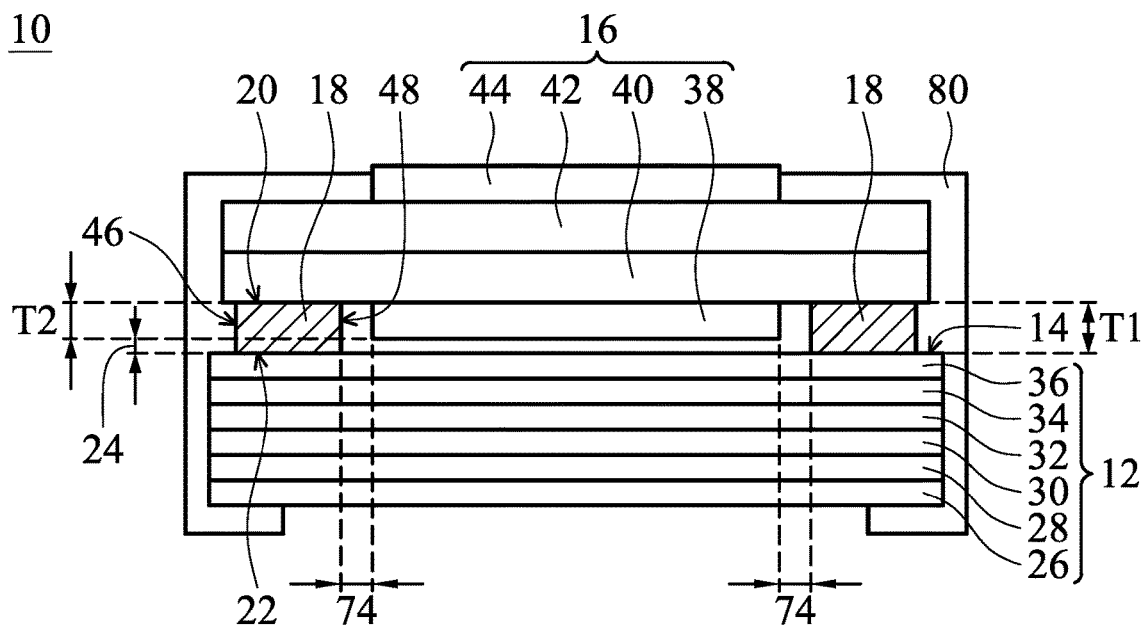

Next, referring to FIG. 7D, a glue 80 is attached on the display panel 16 and the backlight module 12 to cover and fix the display panel 16 and the backlight module 12. Therefore, the fabrication of the display module in this embodiment is completed.

In the present disclosure, an automated glue coating technology is adopted to replace the conventional manual attachment manner, which meets the automation requirements of many semiconductor plants, effectively reducing labor costs and improving productivity.

The present disclosure uses UV-curable resins as the glue for assembling the display panel and the backlight module. Since the reaction rate of the glue is high, the tact time in the manufacturing process is effectively reduced, and productivity is increased. The present disclosure adopts the opaque (e.g., black) glue having an optical density (OD) greater than or equal to 1.2 to achieve a certain degree of the light-shielding effect. The glue is thus suitable for use in devices having light-shielding requirements. In the disclosure, glue with suitable elasticity is selected. While the glue is compressed by the weight of the display panel itself, its original semi-elliptical shape is compressed into, for example, a rectangular or trapezoidal shape so as to increase the contact area between the glue and the backlight module. Therefore, the effect of supporting the thin film glass is achieved to avoid the polarizer directly touching the membrane of the backlight module, which effectively prevents the occurrence of fragmentation. In addition, after the display panel is assembled with the backlight module, since the light-shielding glue is pressed against the membrane of the backlight module, the membrane of the backlight module cannot be removed casually, having the function of fixing the membrane.

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. A display module, comprising:
   a backlight module with an upper surface;
   a display panel opposite to the backlight module, wherein the display panel comprises a thin film substrate and a polarizer disposed on the thin film substrate; and
   a glue having a first contact surface and a second contact surface located between the display panel and the backlight module, wherein the first contact surface is in contact with the thin film substrate of the display panel, the second contact surface is in contact with the upper surface of the backlight module, and there is a gap between the polarizer of the display panel and the backlight module.

2. The display module as claimed in claim 1, wherein the glue has an optical density (OD) that is greater than or equal to 1.2 and is less than or equal to 3.0.

3. The display module as claimed in claim 1, wherein the hardness of the glue is greater than or equal to Shore A80 and is less than or equal to Shore A30.

4. The display module as claimed in claim 1, wherein the thickness of the glue is greater than or equal to 100 µm and is less than or equal to 500 µm.

5. The display module as claimed in claim 1, wherein the first contact surface is substantially parallel to the second contact surface.

6. The display module as claimed in claim 1, wherein the glue has a first side and a second side, and the first side and the second side have a planar surface, a curved surface, or an arc surface.

7. The display module as claimed in claim 1, wherein there is a gap between the glue and the polarizer.

8. The display module as claimed in claim 7, wherein the width of the gap is greater than or equal to 0.1 mm and is less than or equal to 0.3 mm.

9. The display module as claimed in claim 1, wherein the glue is in contact with the polarizer.

10. The display module as claimed in claim 1, wherein the glue has a thickness that is greater than that of the polarizer.

11. The display module as claimed in claim 1, wherein the glue is coated on the thin film substrate using a continuous-type coating process or a segmented-type coating process.

12. The display module as claimed in claim 11, wherein the glue comprising a first portion, a second portion, a third portion and a fourth portion is located between the display panel and the backlight module.

13. The display module as claimed in claim 12, wherein the first portion, the second portion, the third portion and the fourth portion of the glue are connected to each other to form a plurality of junctions therebetween.

14. The display module as claimed in claim 13, wherein the thickness of the junctions is greater than that of the first portion, the second portion, the third portion and the fourth portion of the glue.

15. The display module as claimed in claim 12, wherein the first portion, the second portion, the third portion and the fourth portion of the glue are separated from each other to form a plurality of gaps.

16. A method for fabricating a display module, comprising:
   providing a display panel comprising a thin film substrate and a polarizer disposed on the thin film substrate;
   coating a glue having a first contact surface and a second contact surface, wherein the first contact surface is in contact with the thin film substrate of the display panel;
   performing a UV curing process on the glue;
   providing a backlight module with an upper surface; and
   performing an assembly process to assemble the display panel on the backlight module through the glue, wherein the second contact surface of the glue is in contact with the upper surface of the backlight module, and there is a gap between the display panel and the backlight module.

17. The method for fabricating a display module as claimed in claim 16, wherein the first contact surface is substantially parallel to the second contact surface.

18. The method for fabricating a display module as claimed in claim 16, wherein the UV curing process has an illumination intensity that is greater than or equal to 10 W and is less than or equal to 200 mW.

19. The method for fabricating a display module as claimed in claim 16, wherein the glue has a first side and a second side, and the first side and the second side have a planar surface, a curved surface, or an arc surface.

20. The method for fabricating a display module as claimed in claim 16, wherein the glue has a thickness that is greater than that of the polarizer.

* * * * *